June 28, 1960   R. L. SINK   2,942,457
ROTATION SENSITIVE PICKUP
Filed Feb. 8, 1956   2 Sheets-Sheet 1

INVENTOR.
ROBERT L. SINK
BY
Christie, Parker & Hale
ATTORNEYS

June 28, 1960 R. L. SINK 2,942,457
ROTATION SENSITIVE PICKUP
Filed Feb. 8, 1956 2 Sheets-Sheet 2

INVENTOR.
ROBERT L. SINK
BY
Christie, Parker & Hale
ATTORNEYS

2,942,457

ROTATION SENSITIVE PICKUP

Robert L. Sink, Altadena, Calif., assignor to Bell & Howell Company, Chicago, Ill., a corporation of Illinois Filed Feb. 8, 1956, Ser. No. 564,145

4 Claims. (Cl. 73—71.4)

This invention relates to pickups that are sensitive to rotational motion, particularly rotational vibration, and provides improved instruments which are rugged, are free from the effects of rectilinear vibration, and have high output signals. The pickups of the invention are particularly adapted for mass production at low cost, and the invention permits the construction of vibrometers and the like having increased signal output coupled with increased reliability. If desired, my pickups may be provided with means for translating linear vibration of a mass, say a diaphragm or a seismic element, into rotational vibration, so that they may be employed to measure linear vibration as well as rotational vibration.

The pickups of my invention have a C-shaped magnetic core with pole pieces at the respective ends of the C. A magnetizable bobbin or armature is mounted between the poles of the C and is rotatable on an axis passing transversely through a center line joining the pole pieces of the C-core. The bobbin is of H-shaped section as viewed in a plane through the pole pieces of the C-core transverse to the axis of the bobbin, so that it has four salient poles, with two such poles disposed adjacent each of the poles of the C-core. A secondary or pickup coil is wound on the bobbin around an axis transverse to the rotational axis of the bobbin, so that two of the salient poles are on one side of the pickup coil and two on the other side of the pickup coil. A primary coil is disposed in inductive relationship with the C-core. It may be wound directly around the C-core or around the bobbin perpendicular to the pickup coil. This coil is adapted to be energized with alternating current.

Means are provided for measuring the alternating voltage induced in the pickup coil when it is subjected to rotational vibration. This means may be a mere galvanometer connected to the pickup coil or, if desired, a "ratio" coil may be employed. In this case, the ratio of the voltage induced in the pickup coil to the voltage induced in the "ratio" coil is measured. If the primary coil is wound around the C-core, the "ratio" coil is wound around the bobbin substantially perpendicular to the pickup coil. If the primary coil is wound on the bobbin in place of the ratio coil, the latter is wound around the C-core.

If desired, the secondary coil or coils may be connected to a servo-mechanism.

It is desirable to enclose the space around the bobbin with magnetic shielding in order to assure symmetry of operation and produce virtually constant flux leakages at the poles of the C-core, with resultant improvements in sensitivity and in linearity of response.

A phase correction yoke in the form of a short circuited high conductivity turn may be placed around the C-core to minimize phase differences between energizing and output voltages.

Sensitivity may be adjusted by means of a variable air-gap in the C-core.

The invention will be thoroughly understood in the light of the following description of several presently preferred modifications of my pickup. The description is illustrated by the accompanying drawings, in which.

Figure 1:
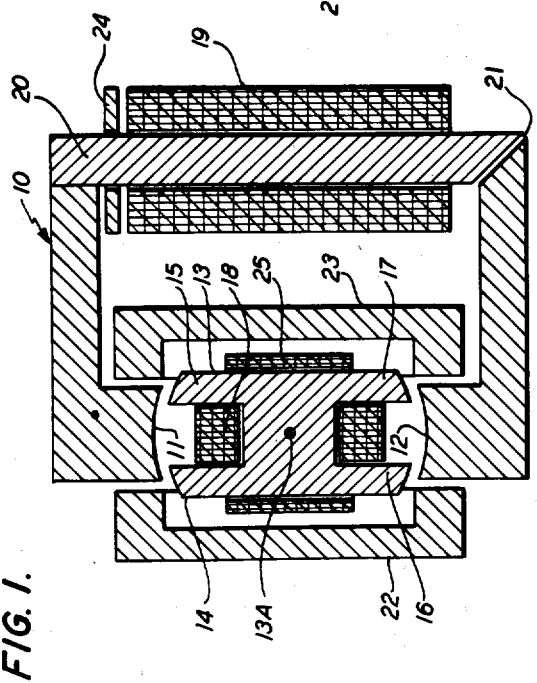
Fig. 1 is a diagrammatic section through one form of the pickup.

The pickup of Fig. 1 comprises a C-shaped magnetic core 10 of soft iron or the like having two pole pieces 11, 12. A bobbin or armature 13 is disposed in the gap between the pole pieces and is mounted for restricted rotation on an axis 13A that is perpendicular to a straight center line joining the pole pieces of the C-core.

The bobbin is of H-section in the plane of the paper, i.e. in a plane parallel to the major surface of the C-shaped core and thus has a pair of salient pole pieces 14, 15 on its upper portion and another pair of salient pole pieces 16, 17 on its lower portion. A centrally disposed secondary or pickup coil 18 is wound symmetrically around the bobbin between the opposing pairs of salient pole pieces. This coil, like the other coils on the pickup to be described later, is essentially square in a plane extending perpendicular to the paper.

An A.C. primary coil 19 is wound around the main leg 20 of the C-shaped core, and an adjustable sensitivity gap 21 is provided in this core at the lower right hand in Fig. 1.

Magnetic shields 22, 23 of soft iron are disposed around the bobbin between the two pole pieces of the C-shaped core.

A short-turn copper yoke or annulus 24 is disposed around the C-shaped core near the upper end of the primary coil.

A flux-measuring or "ratio" coil 25 is wound around the bobbin essentially at right angles to the pickup coil and symmetrically between the two pairs of salient pole pieces.

The pole pieces of the C-shaped core and the salient pole pieces of the bobbin are cut in circular arcs around the bobbin axis, as shown in Fig. 1, the pole pieces of the bobbin being separated from those of the C-shaped core by small gaps.

If an alternating voltage is applied to the primary coil, flux from the pole pieces of the C-shaped core passes through the salient pole pieces of the bobbin. The pickup coil will have virtually no flux linkages except those which pass through the center of the bobbin. When the bobbin is in the position shown in Fig. 1, the effective reluctance of the two poles of each pair of salient poles will be equal, and in this state there will be no tendency for flux linkage to pass through the center of the bobbin.

If the bobbin is rotated clockwise, as viewed in Fig. 1, so that the salient pole 14 of one pair and the salient pole 17 of the other pair lie closer respectively to the pole pieces 11, 12 of the C-shaped core, the gap reluctance at these salient pole pieces decrease, while the gap reluctance of the other two salient pole pieces increases. However, the total gap reluctance remains the same, because the gap reluctance of the pole 14 decreases by the same amount that the gap reluctance of the pole 15 increases while the gap reluctance of the pole 17 decreases by the same amount that the gap reluctance of the pole 16 increases.

When the bobbin is rotated clockwise to produce the conditions just described, there is a tendency for flux that enters the salient pole 14 to leave the bobbin at the salient pole 17, thus producing flux leakage and inducing a voltage in the pickup coil. If on the other hand, the bobbin is rotated in a counterclockwise direction as viewed in Fig. 1, there will be flux leakage through the bobbin in reverse phase and a reverse phase E.M.F. developed in the pickup coil.

The magnetic shields are not absolutely essential to the practice of the invention but are employed to assure complete symmetry of operation and to enable the diagonally opposite poles of the salient pairs to move into completely field-free regions as the pickup is rotated. Such symmetry of operation results in virtually constant flux leakages to the poles of the C-shaped core. Moreover, operation in a field-free region results in substantial improvements in linearity of response and in sensitivity.

The device of Fig. 1 operates on the basis of substantially constant flux independently of the angular position of the bobbin, but its sensitivity may be adjusted readily by altering the adjustable gap in the C-core.

There is a tendency for the voltage in the pickup coil to be 90° out of phase with the voltage of the primary coil, and it is desirable that any phase difference between the two coils be minimized. This may be accomplished by the heavy-low resistance shorted turn represented by the copper yoke 24. Moreover, the presence of the yoke keeps the phase from changing with changes in load on the secondary coil.

Figure 2:
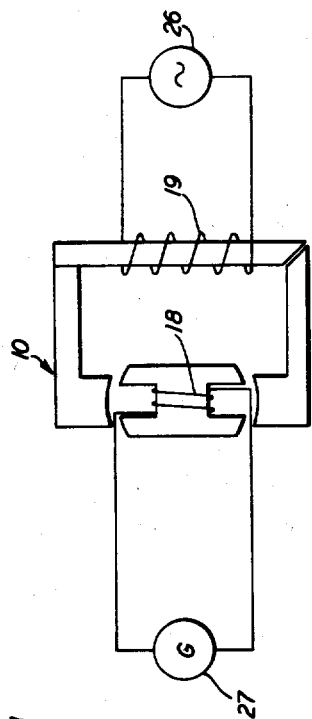
Fig. 2 is a schematic wiring diagram illustrating one way of connecting the pickup of Fig. 1 in a measuring circuit.

If desired, the device of Fig. 1 may be used by energizing the primary coil of Fig. 1 from an A.C. current source 26 (as shown in Fig. 2) and measuring the induced voltage in the pickup coil with a galvanometer 27 (likewise shown in Fig. 2). However, it is preferable to employ the ratio coil 25 in a scheme such as that illustrated in Fig. 3. In this scheme, the ratio of voltage obtained from the pickup coil 18 and the voltage obtained from the coil 25 (rather than the output of the pickup coil alone) is measured. This results in improved accuracy because an extraneous change (such as a change in the voltage applied to the primary coil) affects both of the other coils proportionately.

Figure 3:
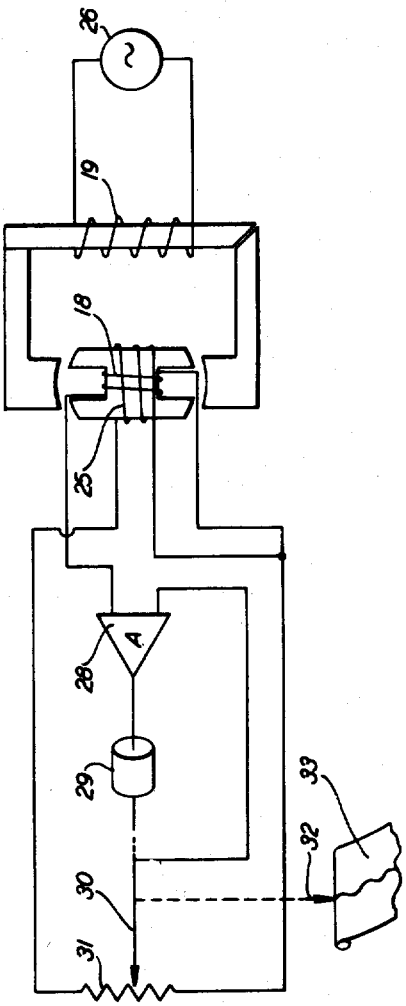
Fig. 3 is a schematic wiring diagram illustrating another way of connecting the pickup of Fig. 1 in a measuring circuit and employing a servo system.

In the apparatus of Fig. 3, the C-core is energized by the primary coil 19 from an A.C. source 26. The pickup coil 18 and the ratio coil 25 are "bucked," i.e. connected in series opposition to the input of a conventional power amplifier 28 which drives a servo motor 29 connected to the slider 30 of a potentiometer 31 and also to the pen 32 of a recorder 33. Connections from the ends of the potentiometer maintain the voltage feedback from the slidewire in equilibrium with that of the pickup coil. In this arrangement, changes in excitation do not result in any change in recorded signal level.

Figure 4:
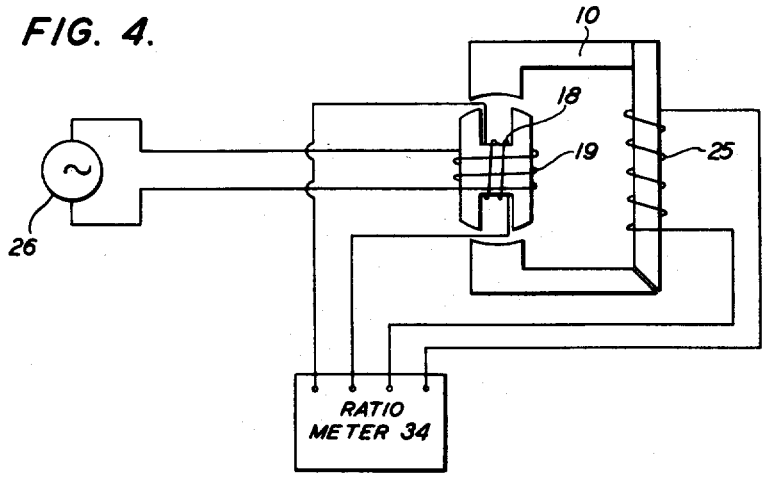
Fig. 4 is a schematic diagram illustrating still a third way of connecting the pickup of Fig. 1 in a measuring circuit.

If desired, the primary or energizing coil 19 and the "ratio" coil 25 may have their positions interchanged. Such an arrangement is shown in Fig. 4, where the primary coil 19 is wound around the bobbin 13 perpendicular to the pickup coil 18 and connected to the A.C. source 26, the ratio coil 25 being wound around the C-core 10. In this arrangement, the pickup coil and the ratio coil are both connected to a conventional ratio meter 34. It will be seen that in the apparatus of Fig. 4 the primary coil is in inductive relationship with the C-core, which has flux produced in it by reason of the flux produced in the bobbin.

The pickup of the invention may, of course, be employed to measure vibrational rotation of a shaft simply by connecting the shaft rigidly to the axis of rotation of the bobbin. When a linear vibration is to be measured, a special linkage is required. Two such linkages are illustrated respectively in Figs. 5 and 6.

Figure 5:
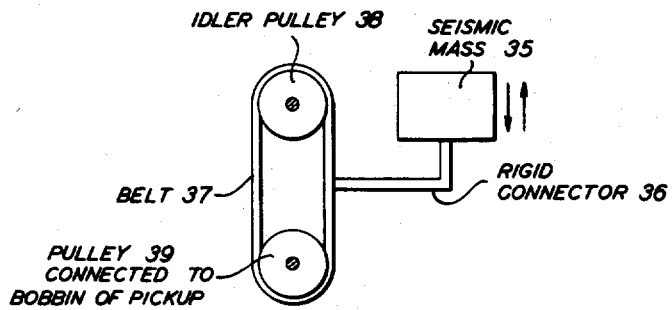
Fig. 5 is a mechanical diagram showing how a translating device may be employed with the pickup of Fig. 1 to permit the pickup to be employed to measure linear vibration.

In Fig. 5, a seismic mass 35 in say a vibrometer or seismometer (not shown) is connected by a rigid right-angled connnector arm 36 to an endless belt 37, which runs over two pulleys 38, 39. One of these pulleys 38 acts as an idler. The other 39 is connected rigidly to the bobbin 13 (not shown in Fig. 5) of the pickup of Fig. 1. As the seismic mass vibrates linearly, its motion is transmitted to the belt, which (acting with the pulleys) converts the linear vibration to rotational vibration that is measured by the pickup.

Figure 6:
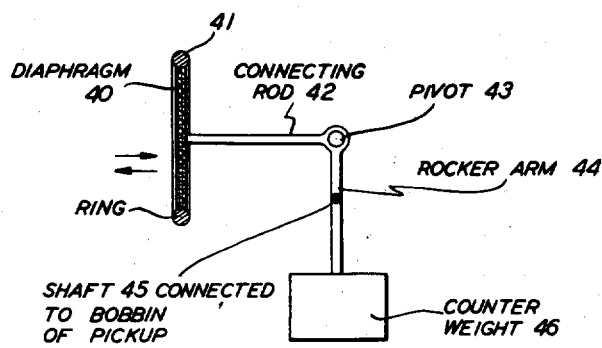
Fig. 6 is another mechanical diagram illustrating the use of another type of translating device with the pickup of Fig. 1 to permit its use in the measurement of linear vibration.

In Fig. 6, a vibrating diaphragm 40 anchored at its periphery by a ring 41 is connected at its center by a rod 42 to a movable pivot 43. The pivot is also connected to a rocker arm or double pendulum 44 which is connected at its pivot shaft 45 with the bobbin of the pickup (not shown in Fig. 6). The other end of the rocker arm carries a counterweight 46. As the diaphragm vibrates its motion is transmitted through the linkage just described to the bobbin of the pickup and at the same time converted to the rotational vibration to which the pickup is sensitive.

In most types of pickups, the zero condition is determined by a difference between substantial values of induced voltages, and stability of zero signal level is, in consequence, difficult to obtain. In contrast, the pickup of the invention is basically stable with respect to zero signal level, since there is no flux through the pickup coil in its zero position. Hence, there may be substantial changes in external conditions, for example in energizing current or voltages, without any effect upon the zero output signal level.

The inherent sensitivity of the instant pickup is high. This is indicated by the following set of sample calculations in which it is assumed that:

A. Maximum flux density in the magnetic circuit is 5000 gauss.
B. Salient pole area of 0.1″ wide x ½″ long for each of the four salient poles.
C. 100 turns in coil 18.
D. The bobbin rotated so that one pair of diagonally opposite salient poles is completely within the shielded region.

With the above assumptions, the total flux linkages are equal to $$0.10 \times 0.50 \times 2.54^2 \times 5000 \times 100 = 163,000 \text{ lines}$$

$$\text{Peak-induced voltage} = \frac{163,000 \times 377}{10^8}$$

$$= 0.62 \text{ volts for a 60 c.p.s. source voltage}$$

$$\text{Sensitivity} = \frac{0.62}{5.70} = 0.11 \text{ volts/degree}$$

The pickup is also relatively insensitive to the effects of external vibrations. Thus, it is inherently symmetrical in design and rectilinear motion of the pickup as a whole does not produce appreciable rotation of the bobbin.

The pickup is inherently simple and rugged in design. The principal mechanical problem in constructing the pickup involves the selection of good bearings for the bobbin. Sleeve-type bearings are, however, satisfactory because vibration of the salient pole pieces due to the alternating magnetic field virtually eliminates the effects of striction. Moreover, the constant striction reluctance provided by the form of construction operates to reduce the tendency of the bobbin to be returned to the zero condition as a result of magnetic forces.

In some applications it may be desirable to employ a saturable magnetic section in series with the magnetic circuit. Such a section is convenient for changing the sensitivity of the device, but suffers from the disadvantage that the output of the pickup may have an inferior wave shape, and hence require a more complicated recording or metering circuit.

I claim:

1. In a pickup sensitive to rotational movement, the combination which comprises a C-shaped magnetizable core having pole pieces at the respective ends of the C, a magnetizable bobbin rotatably mounted on an axis passing transversely through a center line joining the pole pieces of the C-core and being of H-shaped section in a plane passing through the pole pieces of the C-core transverse to the axis of the bobbin so as to have four salient poles, with two neighboring poles normally disposed adjacent each of the poles of the C-core to define a zero position of rotation, a pickup coil wound on the bobbin around an axis transverse to the rotational axis of the bobbin and transverse to the lines of flux through the poles of the bobbin when it is arranged in said zero position so that two of the salient poles are on one side of the pickup coil and two of the salient poles are on the other side of the pickup coil, a primary coil wound on the C-core in inductive relationship therewith, means for applying an alternating voltage to the primary coil, a ratio coil wound on the bobbin perpendicular to the pickup coil, and means for measuring the ratio of the voltages induced in the pickup coil and in the ratio coil.

2. In a pickup sensitive to rotational movement, the combination which comprises a C-shaped magnetizable core having pole pieces at the respective ends of the C, a magnetizable bobbin rotatably mounted on an axis passing transversely through a center line joining the pole pieces of the C-core and being of H-shaped section in a plane passing through the pole pieces of the C-core transverse to the axis of the bobbin so as to have four salient poles, with two neighboring poles normally disposed adjacent each of the poles of the C-core to define a zero position of rotation, a pickup coil wound on the bobbin around an axis transverse to the rotational axis of the bobbin and transverse to the lines of flux through the poles of the bobbin when it is arranged in said zero position so that two of the salient poles are on one side of the pickup coil and two of the salient poles are on the other side of the pickup coil, a primary coil wound on the bobbin perpendicular to the pickup coil and in inductive relationship with the C-core, a ratio coil wound on the C-core, and means for measuring the ratio of the voltages induced in the pickup coil and the ratio coil.

3. In a pickup sensitive to rotational movement, the combination which comprises a C-shaped magnetizable core having pole pieces at the respective ends of the C, a magnetizable bobbin rotatably mounted on an axis passing transversely through a center line joining the pole pieces of the C-core and being of H-shaped section in a plane passing through the pole pieces of the C-core transverse to the axis of the bobbin so as to have four salient poles, with two neighboring poles normally disposed adjacent each of the poles of the C-core to define a zero position of rotation, a pickup coil wound on the bobbin around an axis transverse to the rotational axis of the bobbin and transverse to the lines of flux through the poles of the bobbin when it is arranged in said zero position so that two of the salient poles are on one side of the pickup coil and two of the salient poles are on the other side of the pickup coil, a primary coil disposed in inductive relationship with the C-core, means for applying an alternating voltage to the primary coil, and means for indicating alternating voltage induced in the pickup coil as the bobbin is rotated on its axis, from one position where magnetic lines of flux in said bobbin are diverted from said pickup coil to another position where at least some of the magnetic lines of flux in said bobbin pass through said pickup coil, and linkage means connected to the bobbin at its axis for translating a linear vibrating movement to a rotational vibrating movement.

4. In a pickup sensitive to rotational movement, the combination which comprices a C-shaped magnetizable core having pole pieces at the respective ends of the C, and having an adjustable air gap, a magnetizable bobbin rotatably mounted on an axis passing transversely through a center line joining the pole pieces of the C-core and being of H-shaped section in a plane passing through the pole pieces of the C-core transverse to the axis of the bobbin so as to have four salient poles, with two neighboring poles normally disposed adjacent each of the poles of the C-core to define a zero position of rotation, a pickup coil wound on the bobbin around an axis transverse to the rotational axis of the bobbin and transverse to the lines of flux through the poles of the bobbin when it is arranged in said zero position so that two of the salient poles are on one side of the pickup coil and two of the salient poles are on the other side of the pickup coil, a primary coil wound on the C-core, a ratio coil wound on the bobbin perpendicular to the pickup coil, a magnetic shield disposed around the bobbin, a high-conductivity short circuit turn disposed around the C-core, and means for measuring the ratio of the voltage induced in the pickup coil to the voltage induced in the ratio coil.

References Cited in the file of this patent

UNITED STATES PATENTS

| | | |
|---|---|---|
| 1,964,265 | Markley | June 26, 1934 |
| 2,466,028 | Klemperer | Apr. 5, 1949 |
| 2,557,080 | Dawson | June 19, 1951 |
| 2,598,668 | Barry et al. | June 3, 1952 |
| 2,814,786 | Naul | Nov. 26, 1957 |

FOREIGN PATENTS

| | | |
|---|---|---|
| 19,445 | Great Britain | June 17, 1915 |
| 209,399 | Switzerland | July 1, 1940 |
| 182,169 | Austria | June 10, 1955 |